US012377559B2

(12) United States Patent
Axelrod et al.

(10) Patent No.: US 12,377,559 B2
(45) Date of Patent: Aug. 5, 2025

(54) HAIR TRIMMER AND DESHEDDER FOR PETS

(71) Applicant: FOUR PAWS PRODUCTS, LTD., Neptune City, NJ (US)

(72) Inventors: Glen S. Axelrod, Colts Neck, NJ (US); Ajay Gajria, Monmouth Junction, NJ (US); Diana M. Echeverri, Beachwood, NJ (US)

(73) Assignee: FOUR PAWS PRODUCTS, LTD., Neptune City, NJ (US)

( * ) Notice: Subject to any disclaimer, the term of this patent is extended or adjusted under 35 U.S.C. 154(b) by 316 days.

(21) Appl. No.: 17/816,949

(22) Filed: Aug. 2, 2022

(65) Prior Publication Data

US 2023/0036461 A1 Feb. 2, 2023

Related U.S. Application Data

(60) Provisional application No. 63/203,833, filed on Aug. 2, 2021.

(51) Int. Cl.
*B26B 19/24* (2006.01)
*B26B 21/14* (2006.01)

(52) U.S. Cl.
CPC .............. *B26B 19/24* (2013.01); *B26B 21/14* (2013.01)

(58) Field of Classification Search
CPC .......... B26B 19/02; B26B 19/24; B26B 21/14
See application file for complete search history.

(56) References Cited

U.S. PATENT DOCUMENTS 1,175,023 A * 3/1916 Szabo ..................... B26B 21/12 30/44
1,361,612 A 12/1920 Peterson
(Continued)

FOREIGN PATENT DOCUMENTS

CN 201559205 8/2010
CN 201682867 12/2010
(Continued)

OTHER PUBLICATIONS

International Search Report and Written Opinion from corresponding PCT Appln. No. PCT/US2022/074435, dated Oct. 17, 2022.
(Continued)

*Primary Examiner* — Omar Flores Sanchez
(74) *Attorney, Agent, or Firm* — Grossman, Tucker, Perreault & Pfleger, PLLC

(57) ABSTRACT

A hair grooming device having a longitudinal axis, comprising a plurality of blades each having a longitudinal length which extends along the longitudinal axis, and a plurality of teeth and a plurality of hair receiving openings arranged along the longitudinal length of the blade in alternating succession, respectively; wherein the plurality of blades comprise a movable blade which is movable along the longitudinal axis relative to a second blade of the plurality of blades; wherein the plurality of teeth of the movable blade are movable relative to the plurality of hair receiving openings of the second blade such that each of the plurality of hair receiving openings of the second blade are at least partially laterally coverable at a first side of the second blade by one of the plurality of teeth of the movable blade, respectively, as the movable blade is moved along the longitudinal axis relative to the second blade.

23 Claims, 11 Drawing Sheets

(56) References Cited

U.S. PATENT DOCUMENTS

| | | | | | |
|---|---|---|---|---|---|
| 1,563,332 | A * | 12/1925 | Bristow | B26B 19/24 30/200 |
| 1,642,532 | A * | 9/1927 | Beauregard | B26B 19/066 30/29.5 |
| 1,832,289 | A | 11/1931 | Huntington | |
| 2,270,596 | A * | 1/1942 | Medlen | B26B 19/24 415/121.3 |
| 2,650,421 | A * | 9/1953 | Wietzel | B26B 21/12 30/162 |
| 2,741,842 | A | 4/1956 | Shapin | |
| 3,391,459 | A * | 7/1968 | Rollo | B26B 19/066 30/213 |
| 3,711,948 | A * | 1/1973 | Ford | B26B 19/066 30/212 |
| 3,794,050 | A * | 2/1974 | Gallanis | A45D 24/007 132/119.1 |
| 4,009,517 | A * | 3/1977 | Horn | B26B 19/20 30/30 |
| 4,221,050 | A | 9/1980 | Walter et al. | |
| 4,487,211 | A * | 12/1984 | Sullivan | B26B 13/24 132/213.1 |
| 4,841,634 | A | 6/1989 | Cho | |
| 5,794,348 | A | 8/1998 | Scott | |
| D403,108 | S | 12/1998 | Granito | |
| D448,116 | S | 9/2001 | Granito | |
| D547,005 | S | 7/2007 | Granito | |
| 7,650,858 | B2 | 1/2010 | Porter et al. | |
| 7,717,067 | B2 | 5/2010 | Porter et al. | |
| 8,960,129 | B2 | 2/2015 | Porter et al. | |
| 9,060,496 | B2 | 6/2015 | Porter et al. | |
| D799,116 | S | 10/2017 | Granito | |
| D845,542 | S | 4/2019 | Granito | |
| 2015/0201582 | A1* | 7/2015 | Longoria | B26B 19/24 119/609 |
| 2024/0286302 | A1* | 8/2024 | Zeng | B26B 19/06 |

FOREIGN PATENT DOCUMENTS

| | | |
|---|---|---|
| DE | 3529442 | 2/1987 |
| GB | 2263082 | 7/1993 |
| WO | 91/07113 | 5/1991 |

OTHER PUBLICATIONS

Extended European Search Report from related EPO Appln. No. 22854060.5, dated May 14, 2025.

* cited by examiner

HAIR TRIMMER AND DESHEDDER FOR PETS

CROSS-REFERENCE TO RELATED APPLICATIONS

This U.S. non-provisional patent application claims the benefit of the filing date of U.S. provisional patent application Ser. No. 63/203,833, filed Aug. 2, 2021, the entire disclosure of which is incorporated herein by reference.

FIELD

The present disclosure relates to a hair grooming device, and more particularly a combination hair trimmer and deshedder device, for pets.

BACKGROUND

Hair trimming tools have been reported for a relatively long time. Nevertheless, there remains a need for a hair trimmer and deshedder, particularly suitable for pets, that would effectively remove hair but also lend itself to convenient operation by either a right-handed or left-handed consumer. In addition, there remains a need for such versatility in operation with either a right-handed or left-handed consumer, while providing a measure of safety protection to the animal who is undergoing grooming. In particular, a structure that would provide trimming/deshedding and/or combing action when used by either a left-handed or right-handed individual while providing a blade protector so there is a barrier between the pet and the cutting blades.

SUMMARY

The present disclosure is directed at a hair grooming device for pets, particularly a hair trimmer (cutter) and deshedder for pets. The hair grooming device also provides protection to the pet during trimming (cutting) and/or deshedding and is adaptable to a consumer who may prefer to trim (cut) with a right-handed or left-handed configuration. The hair grooming device may also serve as a comb when the trimming (cutting) and/or deshedding action is not activated.

In at least one embodiment, a hair grooming device having a longitudinal axis is provided, with the hair grooming device comprising a handle, the handle having a longitudinal length which extends along the longitudinal axis; a plurality of blades, the plurality of blades each having a longitudinal length which extends along the longitudinal axis, and the plurality of blades each having a plurality of teeth and a plurality of hair receiving openings arranged along the longitudinal length of the blade in alternating succession, respectively; wherein the plurality of blades comprise a movable blade which is movable along the longitudinal axis relative to a second blade of the plurality of blades; wherein the plurality of teeth of the movable blade are movable relative to the plurality of hair receiving openings of the second blade such that each of the plurality of hair receiving openings of the second blade are at least partially laterally coverable at a first side of the second blade by one of the plurality of teeth of the movable blade, respectively, as the movable blade is moved along the longitudinal axis relative to the second blade.

In at least one embodiment, the movable blade moves linearly along the longitudinal axis.

In at least one embodiment, the second blade is not moveable along the longitudinal axis.

In at least one embodiment, the hair grooming device further comprises a push-button actuator; wherein the push-button actuator is disposed at a first side of the handle; wherein the push-button actuator is coupled to an elastically deformable mechanical linkage such that, upon pressing the push-button actuator, the elastically deformable mechanical linkage deforms to move the movable blade distally along the longitudinal axis.

In at least one embodiment, the hair grooming device further comprises an elastically deformable biasing member; wherein the elastically deformable biasing member is coupled to the elastically deformable mechanical linkage such that, upon pressing the push-button actuator, the elastically deformable biasing member compresses, and upon releasing the push-button actuator, the elastically deformable biasing member decompresses to move the movable blade proximally along the longitudinal axis.

In at least one embodiment, the plurality of blades further comprise an additional movable blade which is movable along the longitudinal axis relative to the second blade of the plurality of blades; the additional movable blade has a longitudinal length which extends along the longitudinal axis, and a plurality of teeth and a plurality of hair receiving openings arranged along the longitudinal length in alternating succession; the plurality of teeth of the additional movable blade are movable relative to the plurality of hair receiving openings of the second blade such that each of the plurality of hair receiving openings of the second blade are at least partially laterally coverable at a second side of the second blade opposite the first side of the second blade by one of the plurality of teeth of the additional movable blade, respectively, as the additional movable blade is moved along the longitudinal axis relative to the second blade.

In at least one embodiment, the hair grooming device further comprises a push-button actuator and an additional push-button actuator; wherein the push-button actuator is disposed at a first side of the handle; wherein the additional-push-button actuator is disposed a second side of the handle opposite the first side of the handle; wherein the push-button actuator is coupled to an elastically deformable mechanical linkage such that, upon pressing the push-button actuator, the elastically deformable mechanical linkage deforms to move the movable blade distally along the longitudinal axis; wherein the additional push-button actuator is coupled to an additional elastically deformable mechanical linkage such that, upon pressing the additional push-button actuator, the additional elastically deformable mechanical linkage deforms to move the additional movable blade distally along the longitudinal axis.

In at least one embodiment, the hair grooming device further comprises an elastically deformable biasing member; wherein the elastically deformable biasing member is coupled to the elastically deformable mechanical linkage and the additional elastically deformable mechanical linkage such that, upon pressing the push-button actuator and the additional push-button actuator, the elastically deformable biasing member compresses, and upon releasing the push-button actuator and the additional push-button actuator, the elastically deformable biasing member decompresses to move the movable blade and the additional movable blade proximally along the longitudinal axis.

In at least one embodiment, the additional movable blade moves linearly along the longitudinal axis.

In at least one embodiment, the second blade is disposed between the movable blade and the additional movable blade.

In at least one embodiment, the plurality of blades are selectively operable as trimmer which cuts hair, or a deshedder which desheds hair without cutting.

In at least one embodiment, the movable blade is detachable from the device and attachable to the device by hooks disposed on the movable bade.

In at least one embodiment, a method of operating a hair grooming device having a longitudinal axis is provided, the method comprising providing the hair grooming device, the hair grooming device comprising a handle, the handle having a longitudinal length which extends along the longitudinal axis; a plurality of blades, the plurality of blades each having a longitudinal length which extends along the longitudinal axis, and the plurality of blades each having a plurality of teeth and a plurality of hair receiving openings arranged along the longitudinal length of the blade in alternating succession, respectively; wherein the plurality of blades comprise a movable blade which is movable along the longitudinal axis relative to a second blade of the plurality of blades; wherein the plurality of teeth of the movable blade are movable relative to the plurality of hair receiving openings of the second blade such that each of the plurality of hair receiving openings of the second blade are at least partially laterally coverable at a first side of the second blade by one of the plurality of teeth of the movable blade, respectively, as the movable blade is moved along the longitudinal axis relative to the second blade; and moving the movable blade relative to the second blade such that each of the plurality of hair receiving openings of the second blade are at least partially laterally covered at a first side of the second blade by one of the plurality of teeth of the movable blade, respectively.

In at least one embodiment, the method further comprises selectively operating the hair grooming device as trimmer which cuts hair, or a deshedder which desheds hair without cutting,

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
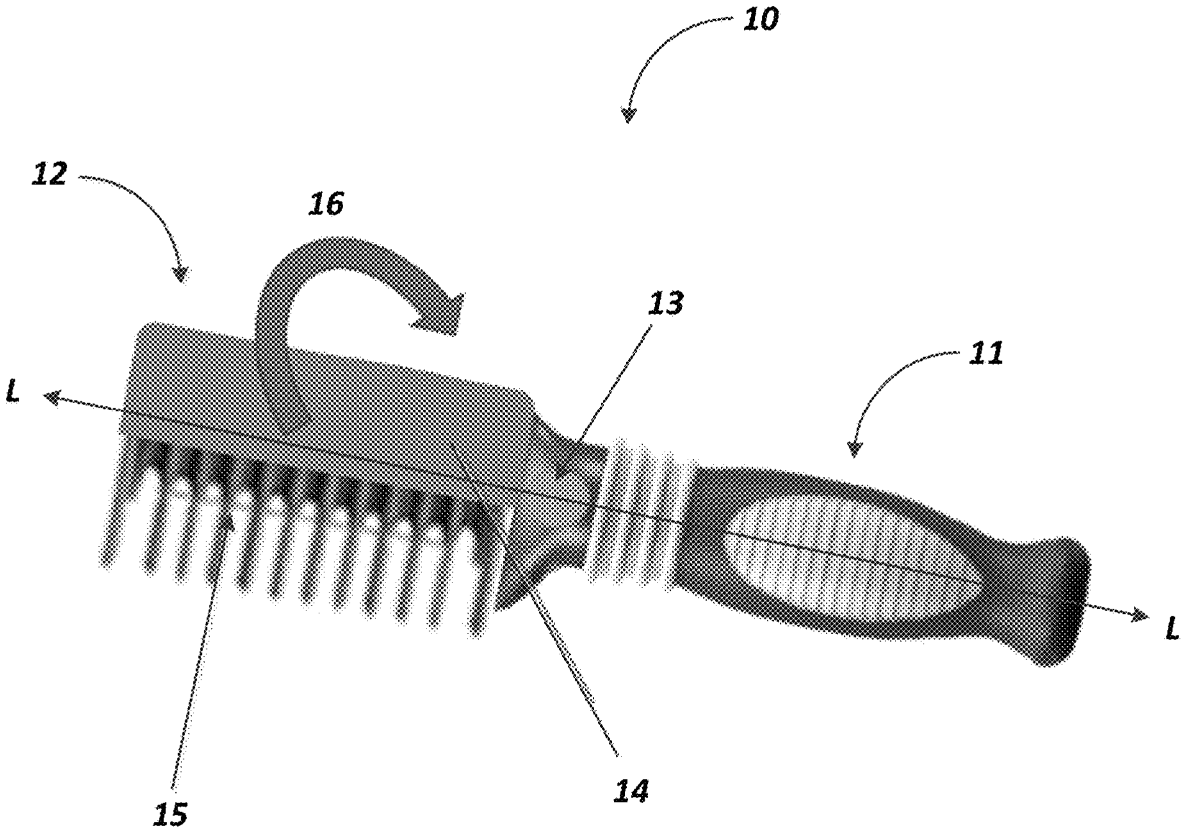
FIG. 1 is a perspective view of a hair grooming device according to the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting.

Reference is made to FIG. 1 which provides a perspective view of an embodiment of a hair grooming device 10 of the present disclosure, which has is arranged for use by a right-handed user. The hair grooming device 10 has a handle 11 which has a longitudinal length which extends along a longitudinal axis L-L of the device 10. As shown, the longitudinal length of handle 11 extends substantially parallel to the longitudinal axis L-L (e.g. within 5 degrees of being parallel), and more particularly parallel to the longitudinal axis L-L.

The hair grooming device 10 also has a trimming (cutting) and/or deshedding region 12 which also extends longitudinally along the longitudinal axis L-L of the device 10, adjacent the handle 11. More particularly, the trimming (cutting) and/or deshedding region 12 has a longitudinal length which extends along the longitudinal axis L-L of the device 10. As shown, the longitudinal length of the trimming (cutting) and/or deshedding region 12 extends substantially parallel to the longitudinal axis L-L (e.g. within 5 degrees of being parallel), and more particularly parallel to the longitudinal axis L-L.

The hair grooming device 10 further has a mechanical push-button actuator 13, to engage, and more particularly moves, one or more planar, adjacent blades A-C arranged side-by-side (see FIG. 5) along the longitudinal axis L-L, and a blade protector 14. As can be seen by arrow 16, the blade protector 14, which may include a comb section 15 which may therefore be considered a comb attachment, is rotationally engaged to the hair grooming device 10 such that the blade protector 14 can be rotated to either side of the hair grooming device 10. As illustrated in FIG. 1, the blade protector 14 presents a barrier as between the pet and the blades A-C.

Figure 2:
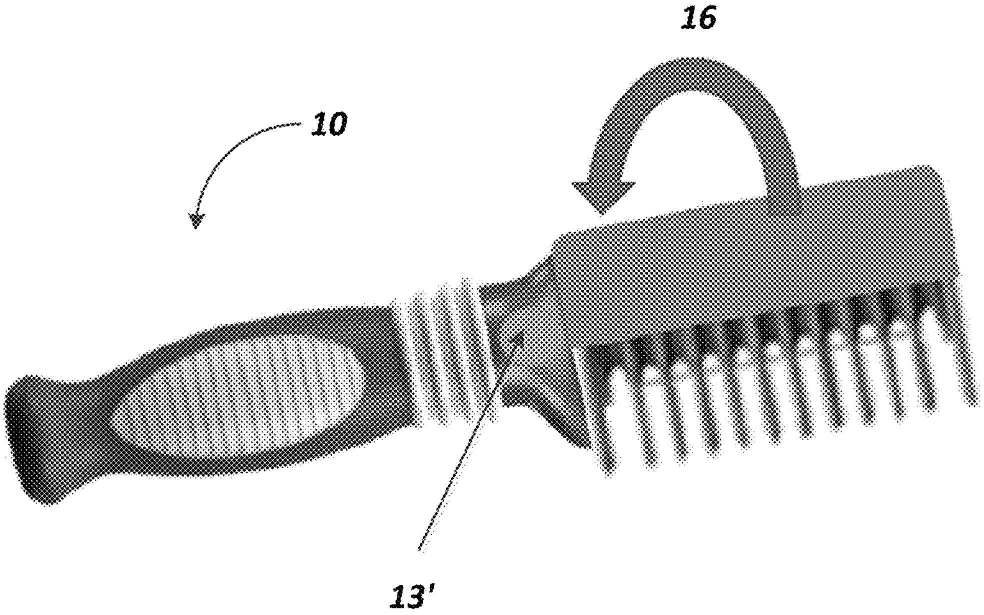
FIG. 2 is another perspective view of the hair grooming device of FIG. 1.
Figure 3:
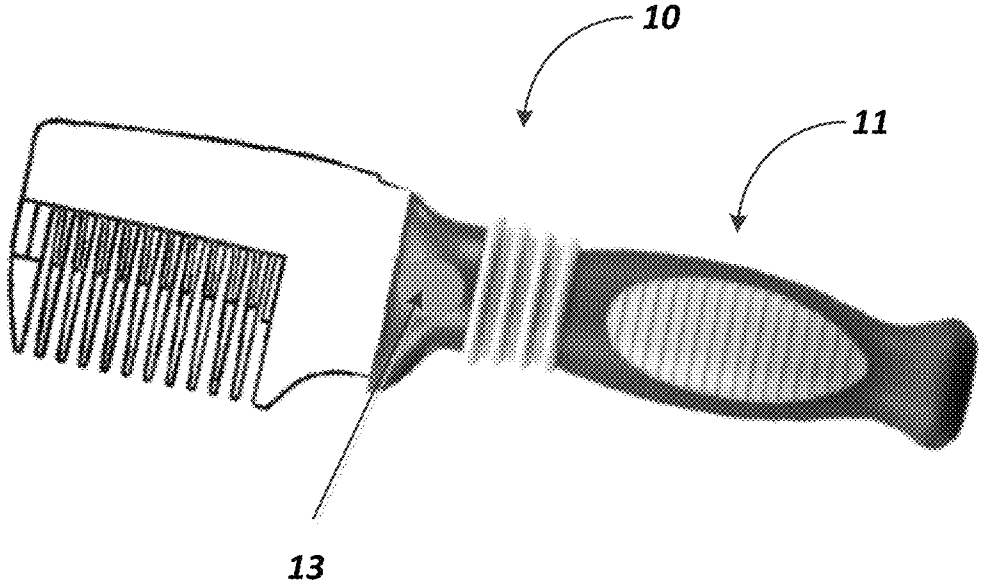
FIG. 3 is another perspective view of the hair grooming device of FIG. 1.
Figure 4:
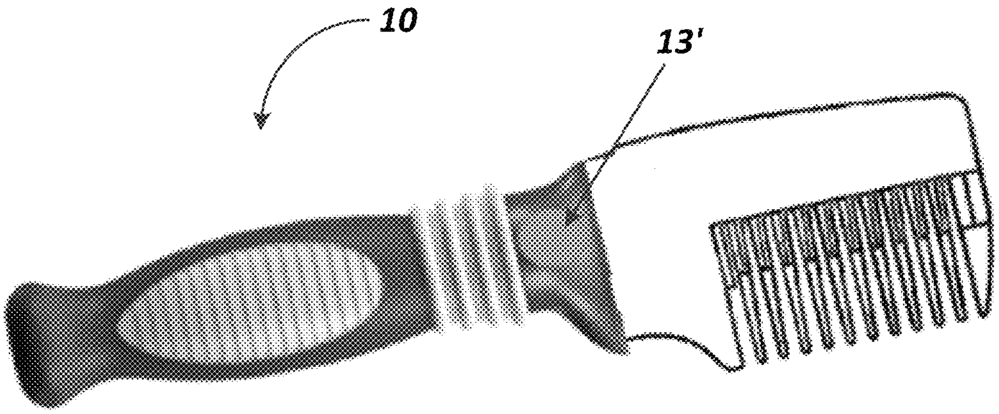
FIG. 4 is another perspective view of the hair grooming device of FIG. 1.

FIG. 2 shows the opposite side of the hair grooming device 10, which is arranged for use by a left-handed user. As shown, hair grooming device 10 includes a second mechanical push-button actuator 13', to engage the one or more planar blades A-C (again, see FIG. 5). FIGS. 3-4 show the blades A-C more clearly as they are not partially covered or protected by the blade protector 14.

Second push-button actuator 13', like push-button actuator 13, engages, and more particularly moves, one or more of the blades A-C along the longitudinal axis L-L to trigger cutting and/or deshedding, particularly via a shearing action, by the blades A-C. It may therefore now be appreciated that with a button actuators 13, 13' on both sides of the hair grooming device 10, the cutting and/or deshedding may be initiated by the user, whether held and operated by a left-handed user or right-handed user. The buttons actuators 13, 13' may also be independently placed in an "on" or "off" position.

Figure 5:
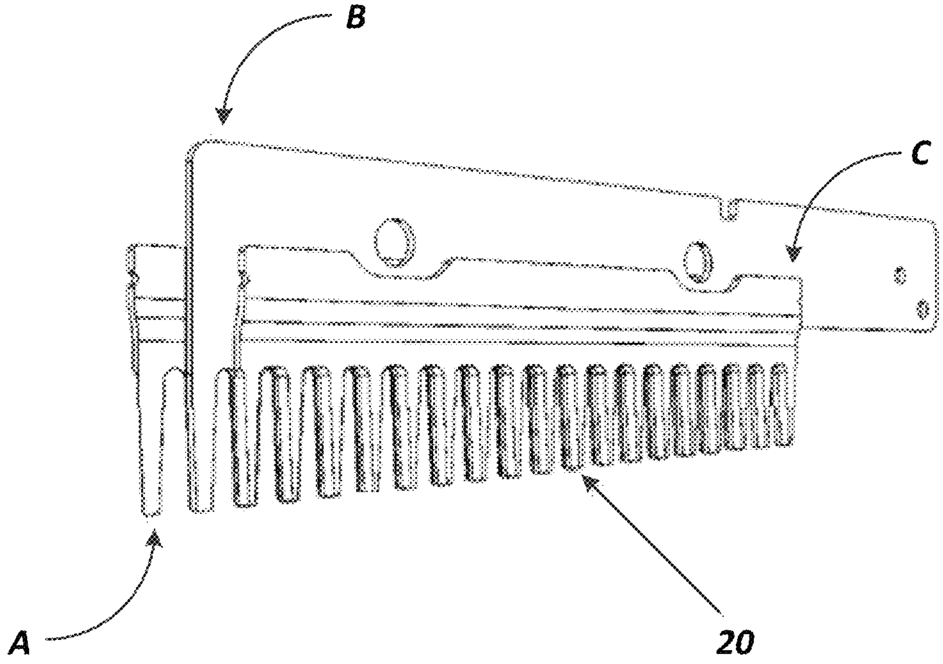
FIG. 5 is a perspective view of a blade arrangement of the hair grooming device of FIG. 1.
Figure 6:
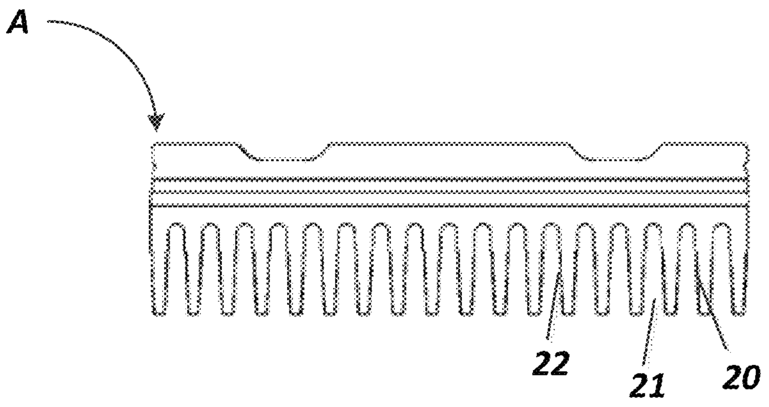
FIG. 6 is a side view of a blade of the blade arrangement of FIG. 5.
Figure 7:
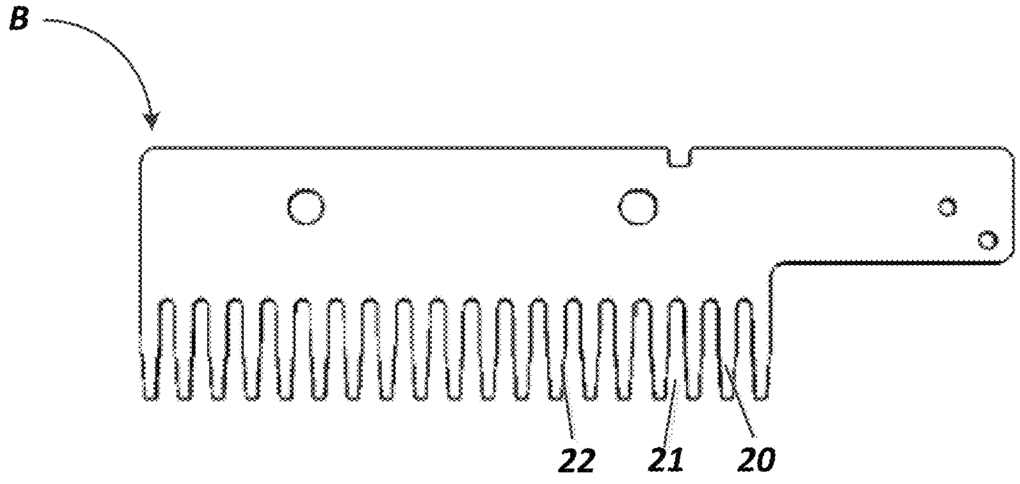
FIG. 7 is a side view of another blade of the blade arrangement of FIG. 5.
Figure 8:
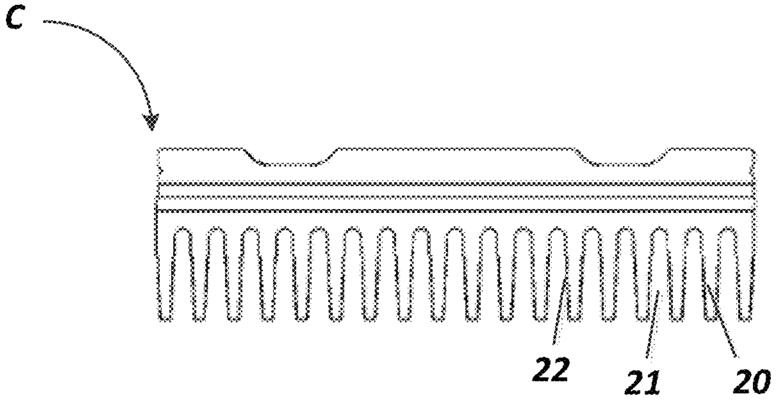
FIG. 8 is a side view of another blade of the blade arrangement of FIG. 5.

Referring now to FIGS. 5-8, there are shown blades A-C. In FIG. 5, the blades A-C are shown in side-by-side arrangement, while in FIGS. 6-8 they are shown individually. Blades A and B, as well as B and C, may be particularly arranged to contact against one another during operation of hair grooming device 10. As shown, blades A-C each include a plurality of uniform elongated cutting projections/teeth 20 which are each separated (alternating) by uniform elongated recess/spaced hair receiving openings 21 therebetween. As shown. The projections/teeth 20 extend substantially perpendicular to the longitudinal axis L-L (e.g. within 5 degrees of being perpendicular), and more particularly perpendicular to the longitudinal axis L-L, and the hair receiving opening 21 may have a V-shaped lead-in region and a U-shaped base region.

Figure 9:
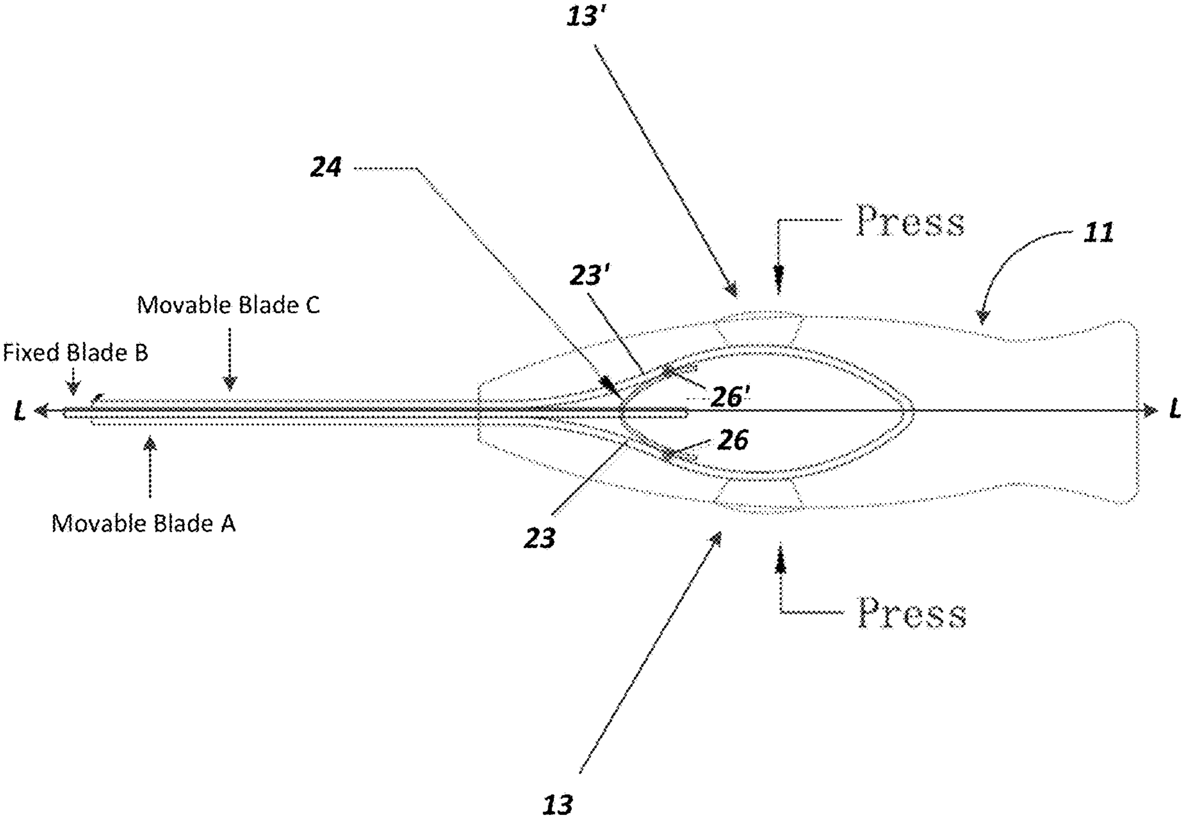
FIG. 9 is an internal side view of the hair grooming device of FIG. 1.

FIG. 9 provides a cut-away perspective view of the hair grooming device 10 that reveals the two-button operation noted above. As shown, the center blade B is positioned as fixed (stationary relative to handle 11) between the two outer blades A and C, which can be independently moved longitudinally, and more particularly horizontally when the longitudinal axis L-L is arranged horizontal. As may be appreciated, upon pressing of either push-button 13 or 13', such will force one of the outer movable blades A or C to move linearly in a longitudinal (horizontal) direction relative to the center fixed blade B. This then would provide the desired cutting or deshedding action for a given pet where the pet's hair is to be removed.

As shown by FIGS. 1-9. blades A-C have a longitudinal length which extends substantially parallel to the longitudinal axis L-L (e.g. within 5 degrees of being parallel), and more particularly parallel to the longitudinal axis L-L. Moreover, blades A-C extend substantially parallel to each other (e.g. within 5 degrees of being parallel), and more particularly parallel to each other, As shown by FIG. 9, the blades A-C preferably comprise at least one movable blade A, C and one stationery blade B. More particularly, blades A and C provide first and second movable blades, respectively, that may be moved longitudinally (shown as horizontally), along the longitudinal axis L-L, and more particularly substantially parallel with the longitudinal axis L-L (e.g. within 5 degrees of being parallel), and more particularly parallel with the longitudinal axis L-L, upon pushing of the button actuator 13 or 13', respectively. On the other hand, blade B is an intermediate/middle fixed blade, i.e. which does not move longitudinally along the longitudinal axis L-L, disposed between blades A and C.

As shown, each movable blade A and C is respectively mechanically coupled to push-button actuator 13, 13' by a curved elastically deformable mechanical linkage 23, 23', each having a curvature which extends along the longitudinal axis L-L. As may be understood, when push-button actuator 13 is pressed inward towards longitudinal axis L-L, the curvature of the elastically deformable linkage 23 decreases and the elastically deformable linkage 23 becomes more planar causing the elastically deformable linkage 23 to elongate longitudinally, thus resulting in movable blade A coupled thereto to extend and move longitudinally along the longitudinal axis L-L away/distally/outward from handle 11.

Similarly, when push-button actuator 13' is pressed inward towards longitudinal axis L-L, the curvature of the elastically deformable linkage 23' decreases and the elastically deformable linkage 23' becomes more planar causing the elastically deformable linkage 23' to elongate longitudinally, thus resulting in movable blade C coupled thereto to extend and move longitudinally along the longitudinal axis L-L away/distally/outward from handle 11.

As shown, within handle 11, there is also contained an elastically deformable biasing member 24, in the form of a leaf spring, mechanically coupled to the elastically deformable linkages 23, 23', particularly by a mechanical fastener 26, 26' such as a rivet. When the pressing force is applied to push-button actuators 13, 13', the elastically deformable biasing member 24 compresses and biases the away/distal/outward movement of movable blades A and C. As such, when the pressing force applied to push-button actuators 13, 13' is terminated or otherwise removed such that the push-button actuators 13, 13' are released, the elastically deformable biasing member 24 decompresses, causing the elastically deformable linkages 23, 23' to contract (retract) longitudinally, thus resulting in movable blades A and C coupled thereto to retract and move longitudinally along the longitudinal axis L-L towards/proximally/inward to handle 11, along with push-button actuator 13, 13, returning to a unpressed position from the pressed position.

With regards to alignment of the cutting projections/teeth 20 and the hair receiving openings 21, when the push-button actuators 13, 13' are in their unpressed position, the cutting projections/teeth 20 are aligned such that the cutting projections/teeth 20 of each of the blades A-C laterally overlap/overlie one another (transverse to the longitudinal length and longitudinal axis), in which case it may also be understood that the hair receiving openings 21 are also aligned such that the hair receiving openings 21 of each of the blades A-C laterally overlap/overlie one another. Conversely, when one of the push-button actuators 13, 13' is pressed/pushed into its pressed position, the cutting projections/teeth 20 of movable blade A/C move gradually longitudinally across/over the planar face of blade B, and more particularly the hair receiving openings 21 of blade B, such that the cutting projections/teeth 20 of movable blade A or C gradually narrows/occludes/obstructs or otherwise covers the width of laterally overlapping/overlying hair receiving openings 21 of blade B and blade A or C. As the laterally overlapping/overlying hair receiving openings 21 of blade B and blade A or C narrow, hair within the hair receiving openings 21 is subject to cutting via shearing action of the elongated cutting edges 22 of blade B and blade A or C, particularly when the elongated cutting edges 22 of blade A pr C begins to laterally overlap with the elongated cutting edges 22 of blade B. Stated another way, the longitudinal movement of blades A and C is preferably sufficient to completely laterally overlap an adjacent hair receiving openings 21 of blade B, whereby the cutting edges 22 of blade B with blade A or C laterally overlap when push-button actuators 13, 13' are fully pressed.

As such, the plurality of projections/teeth 20 of the movable blade A or C are movable relative to the plurality of hair receiving openings 21 of the fixed blade B such that each of the plurality of hair receiving openings 21 of the fixed blade B are at least partially laterally coverable at either side of the fixed blade B by one of the plurality of projections/teeth 20 of the movable blade A or C, respectively, as the movable blade A or C is moved along the longitudinal axis L-L relative to the fixed blade B.

As may therefore be appreciated, when an animal's hair impinges upon and is positioned between the blades A, B and C, and blade A or C is moved longitudinally (shown as horizontally) relative to fixed blade B, the animal's hair will be effectively cut and removed.

Expanding on the above, when blade A or C are moved longitudinally (shown as horizontally) relative to blade B, blades A or C can be moved a selective amount that will result in an actually cutting of the animal's hair. However, blades A or C may be configured such that they are only moved an amount that will restrict the hair receiving openings 21 formed by the plurality of cutting projections 20, so that the blades are in a configuration that will provide deshedding of the animal's loose hair when the blades are run through the animal's coat without cutting. For example, the opening that is present between the cutting projections may be restricted down to a hair receiving opening in the range of 0.5 mm to 5.0 mm such that the blades can effectively remove loose hair that is present within the coat and available for removable. But as noted, blades A or C may be configured such that at any desired location on the animal's coat, it can be moved longitudinally (shown as horizontally), and act to actually cut the animal's hair at such location, as selected by the user.

Figure 10:
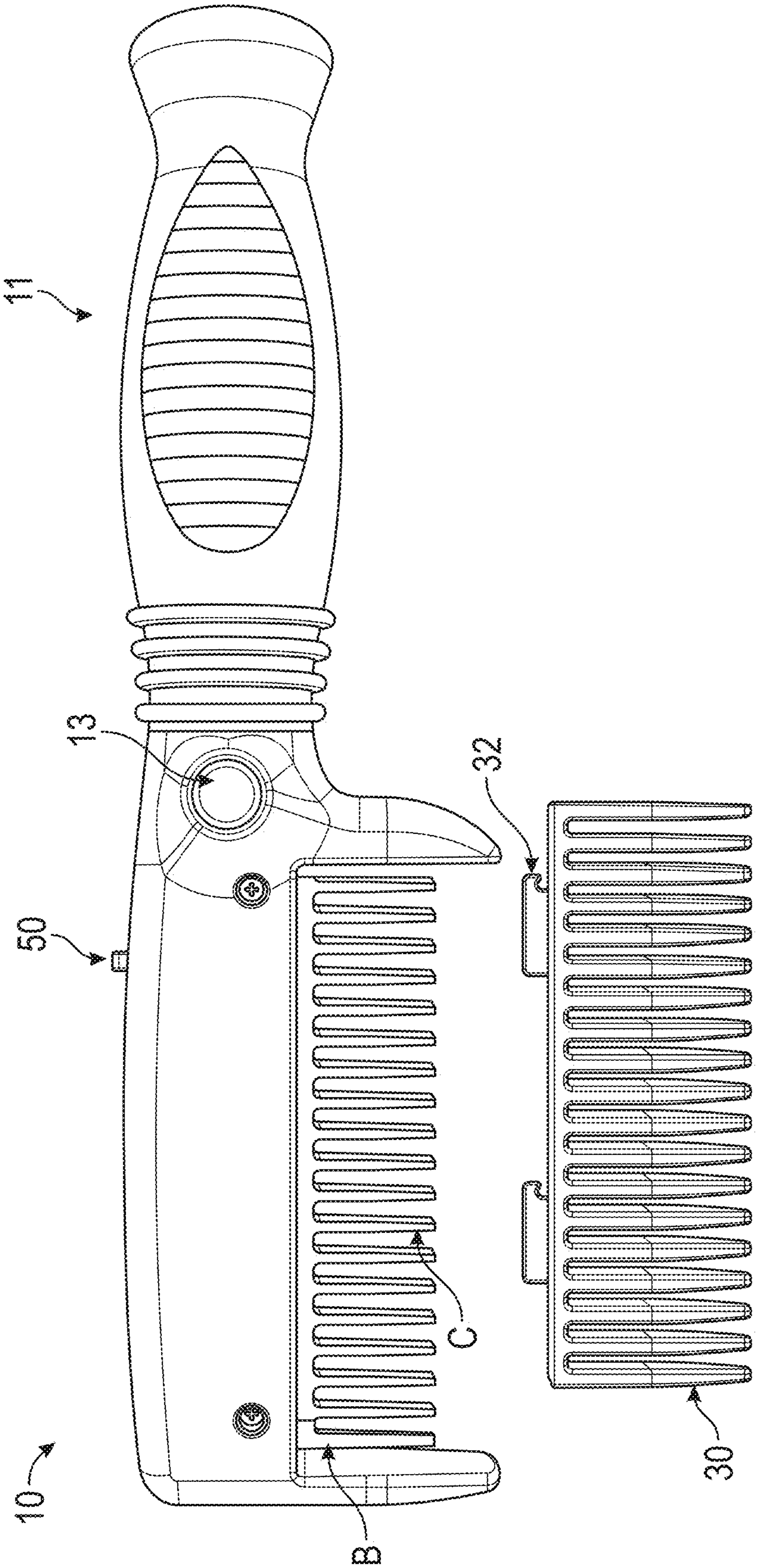
FIG. 10 is side view of another hair grooming device according to the present disclosure.

A further embodiment is illustrated in FIG. 10, which shows a hair grooming device 10, which provides a trimmer/deshedder, with the three-blade construction, where the center blade is fixed and two outer blades are movable, one of which is selectively configured to move upon pressing of the push-button actuator 13. As illustrated in FIG. 10, blade C is shown, which is movable longitudinally (horizontally) relative to the permanently fixed blade B upon pressing of the push-button actuator 13. Movable blade A has been removed, and is not shown in FIG. 10. Rather, a separate comb attachment 30 is illustrated with attachment hooks 32 that may be mechanically engaged and positioned over fixed blade B which may then provide the hair grooming device 10, particularly as a trimmer/deshedder for use by an individual holding the device in their left-hand. Such comb attachment comb 30 may also be positioned on the other side of the hair grooming device 10 to accommodate a user's preference to hold the hair grooming device 10 with either their right or left hand. The comb attachment 30 may also act as a blade protector. It should also be understood that blades A-C may be attachable/removable in the same manner as comb attachment 30.

Figure 11:
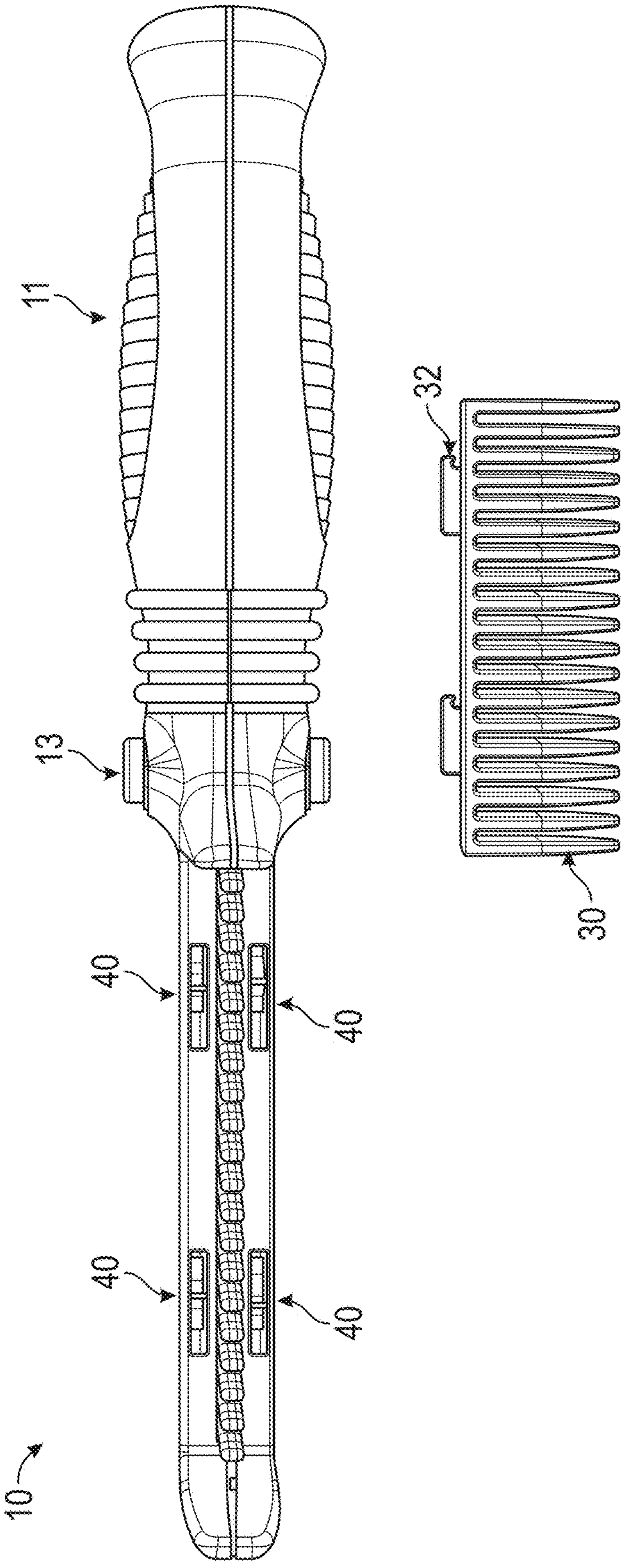
FIG. 11 is a bottom view of the hair grooming device of FIG. 10.

Reference is made to FIG. 11 which illustrates how the comb attachment 30 may be preferably positioned and mechanically engaged on either side of the hair grooming device 10 as a trimmer/deshedder, with the attachment hooks 30 insertable or otherwise receivable within attachment hook receptacles 40.

Figure 12:
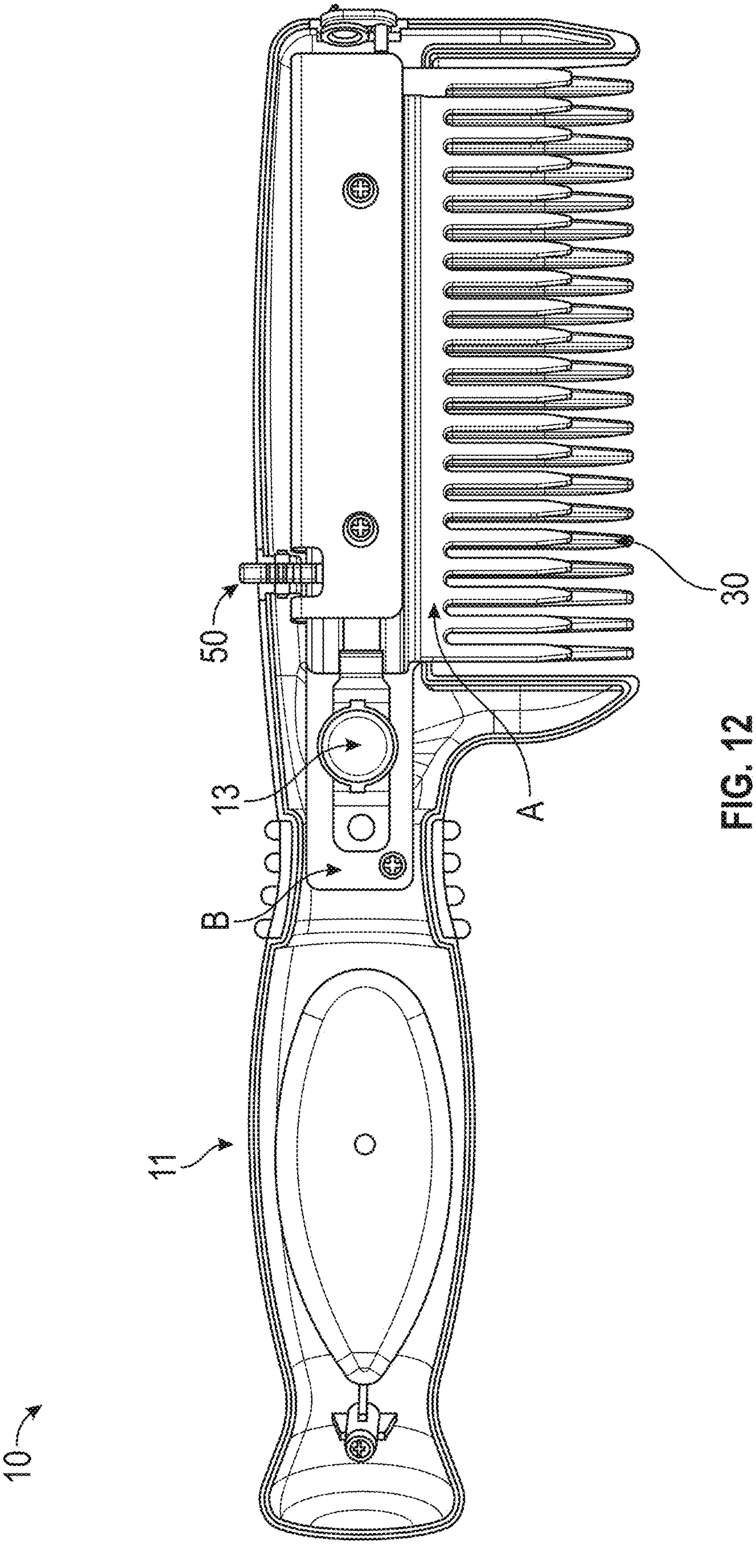
FIG. 12 is an internal side view of the hair grooming device of FIG. 10.

FIG. 12 illustrates a cut-away internal view of the other side of the hair grooming device 10 as a trimmer/deshedder, again identifying the comb attachment 30, the permanently fixed blade B and the movable blade A, along with a safety button 50. The optional safety button 50 operates to lock one of the two movable blades A or C that is not in use. An oil reservoir is optionally present for the purpose of lubrication and extending the life of the blades.

Figure 13:
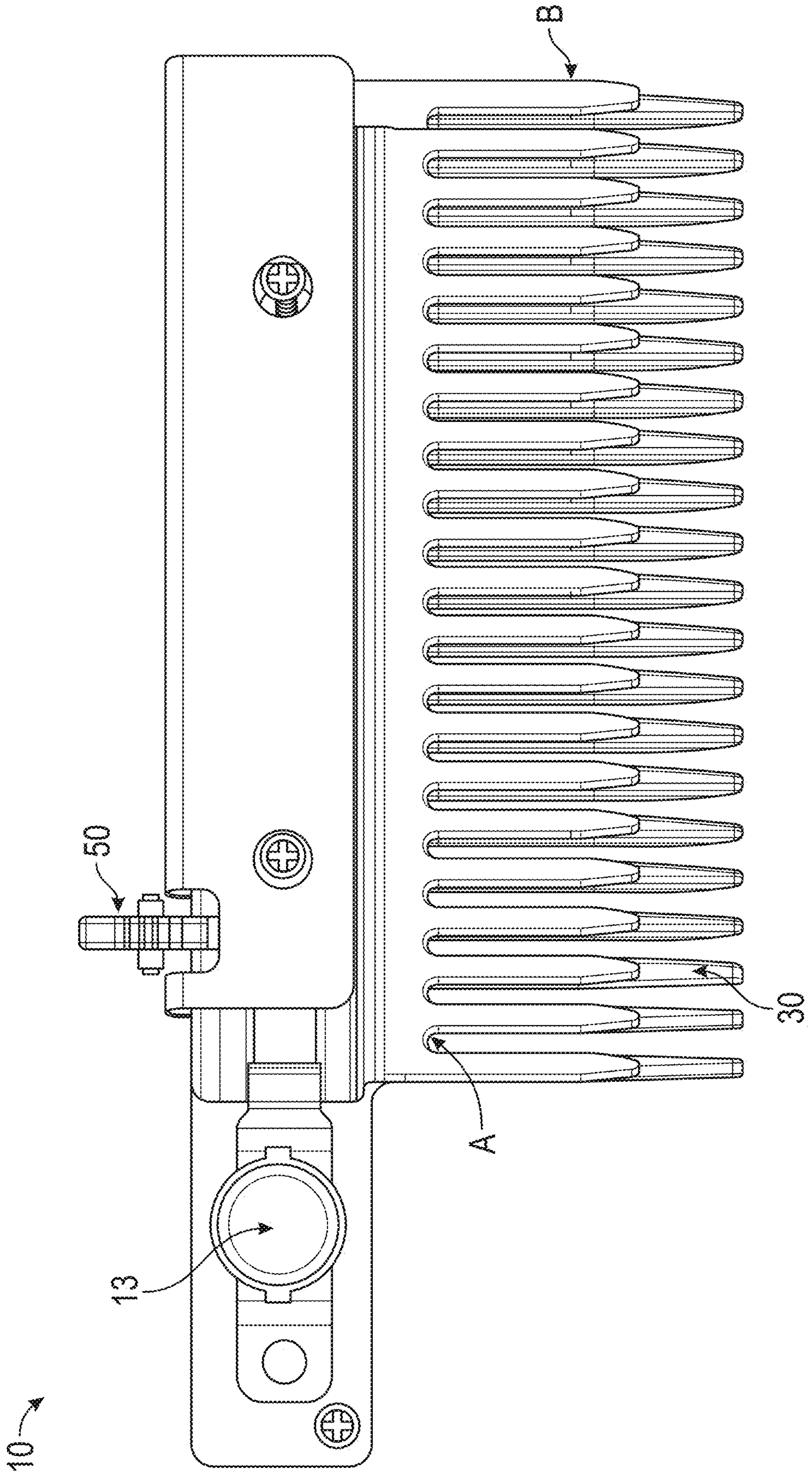
FIG. 13 is another internal side view of the hair grooming device of FIG. 10.
Figure 14:
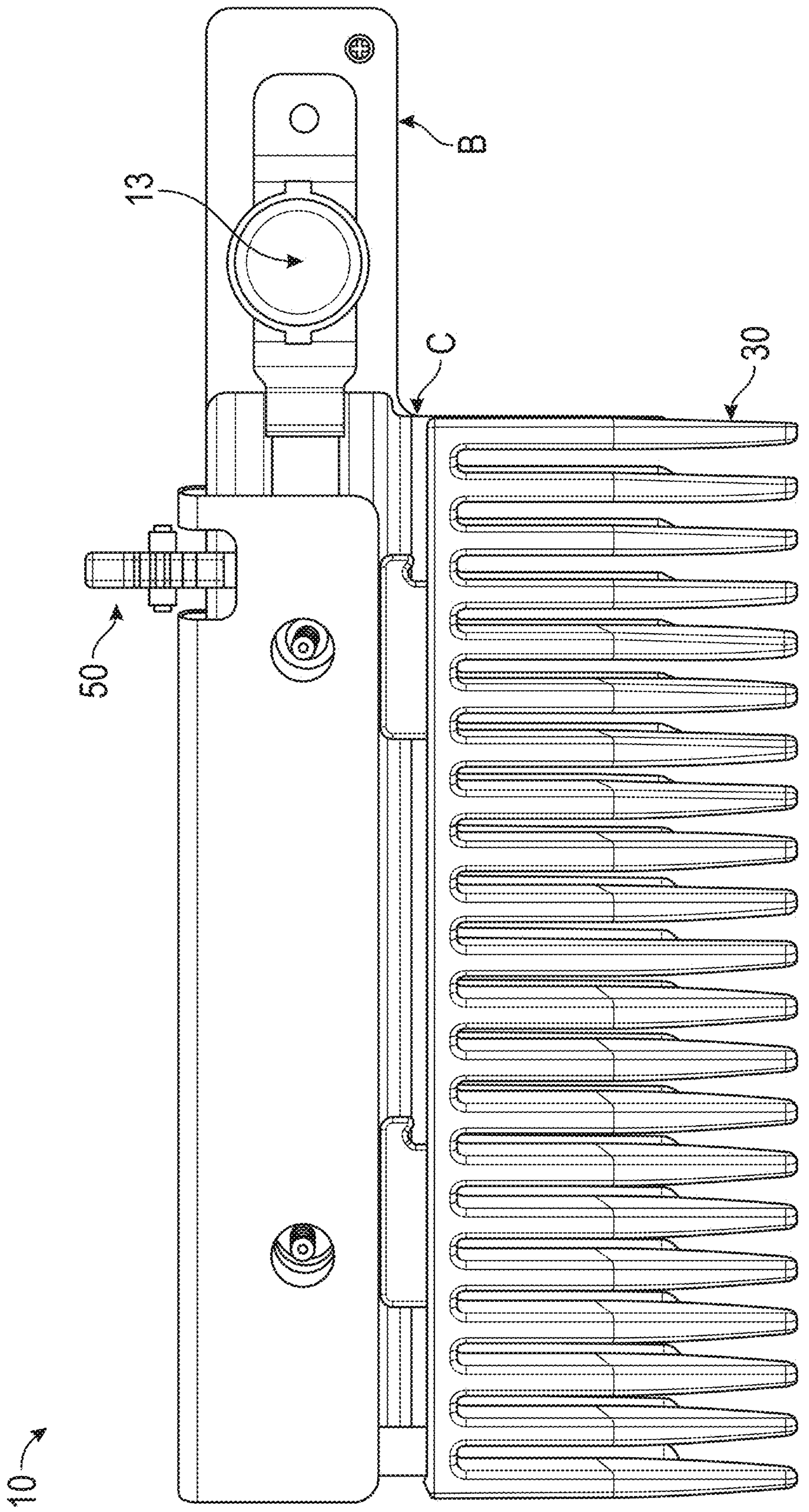
FIG. 14 is another internal side view of the hair grooming device of FIG. 10.

FIG. 13 provides another cut-away view internal view showing the push-button actuator 13 for blade A, the permanently fixed blade V, and the comb attachment 30. FIG. 14 shows a cut-away internal view showing the push-button actuator 13 for blade C and the comb attachment 30

Figure 16:
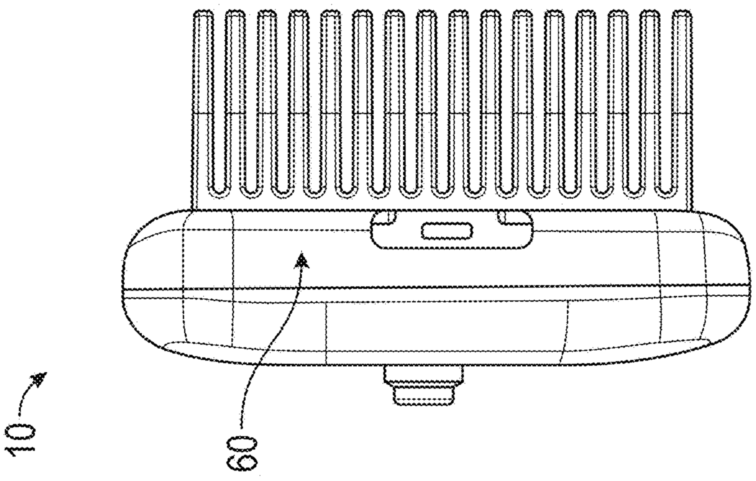
FIG. 16 is an end view of the hair grooming device of FIG. 15.
Figure 15:
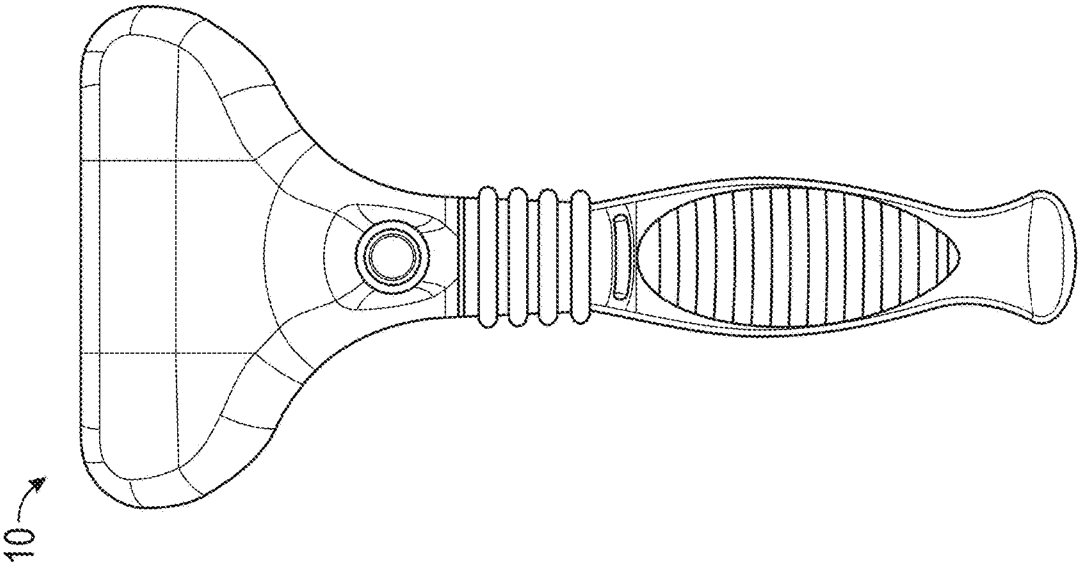
FIG. 15 is a top view of another hair grooming device according to the present disclosure.

FIGS. 15 and 16 show another embodiment of the hair grooming device 10 as a trimmer/deshedder. In this embodiment, one can utilize a sliding switch 60 to move the movable blades A horizontally. The sliding switch 60 as shown may therefore assume two positions: (1) Position 1 is the comb position in which the movable blade (see again FIG. 3, movable blade A or C) is configured so that the hair grooming device 10 as a trimmer/deshedder only functions as comb; (2) Position 2, where movable blade A or C is moved to reduce the openings between the cutting projections to either deshed or actually cut the animal's hair.

As may be appreciated from all of the above, the present invention stands directed to a hair grooming device for a pet, comprising a handle, a trimming (cutting) and/or deshedding region, a mechanical push-button actuator engaged to at least one moving blade and at least one stationery blade, wherein the moving blade is configured to move relative to the at least one stationery blade, and an option blade protector rotationally connected to said trimming (cutting) and/or deshedding region, wherein the blade protector may be rotated to either side of said hair trimmer. The blade protector, when positioned on either side of the hair grooming device, can then present a barrier as between the pet whose hair is be removed and the blades. The hair grooming device, as a trimmer/deshedder, may therefore be readily configured for operation by either a left-handed or right-handed user, while preserving the ability for the blade protector to be effectively utilized in either configuration.

While particular embodiments of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed:

1. A hair grooming device having a longitudinal axis, the hair grooming device comprising:

a handle, the handle having a longitudinal length which extends along the longitudinal axis;

a plurality of blades, the plurality of blades each having a longitudinal length which extends along the longitudinal axis, and the plurality of blades each having a plurality of teeth and a plurality of hair receiving openings arranged along the longitudinal length of the blade in alternating succession, respectively;

wherein the plurality of blades comprise a movable blade which is movable along the longitudinal axis relative to a second blade of the plurality of blades;

wherein the plurality of teeth of the movable blade are movable relative to the plurality of hair receiving openings of the second blade such that each of the plurality of hair receiving openings of the second blade are at least partially laterally coverable at a first side of the second blade by one of the plurality of teeth of the movable blade, respectively, as the movable blade is moved along the longitudinal axis relative to the second blade;

a push-button actuator;

wherein the push-button actuator is disposed at a first side of the handle;

wherein the push-button actuator is coupled to an elastically deformable mechanical linkage such that, upon pressing the push-button actuator, the elastically deformable mechanical linkage deforms to move the movable blade distally along the longitudinal axis.

2. The device of claim 1, wherein:

the movable blade moves linearly along the longitudinal axis.

3. The device of claim 1, wherein:

the second blade is not moveable along the longitudinal axis.

4. The device of claim 1, further comprising:

an elastically deformable biasing member;

wherein the elastically deformable biasing member is coupled to the elastically deformable mechanical linkage such that, upon pressing the push-button actuator, the elastically deformable biasing member compresses, and upon releasing the push-button actuator, the elastically deformable biasing member decompresses to move the movable blade proximally along the longitudinal axis.

5. The device of claim 1, wherein:

the plurality of blades further comprise an additional movable blade which is movable along the longitudinal axis relative to the second blade of the plurality of blades;

the additional movable blade has a longitudinal length which extends along the longitudinal axis, and a plurality of teeth and a plurality of hair receiving openings arranged along the longitudinal length in alternating succession;

the plurality of teeth of the additional movable blade are movable relative to the plurality of hair receiving openings of the second blade such that each of the plurality of hair receiving openings of the second blade are at least partially laterally coverable at a second side of the second blade opposite the first side of the second blade by one of the plurality of teeth of the additional movable blade, respectively, as the additional movable blade is moved along the longitudinal axis relative to the second blade.

6. The device of claim 5, further comprising:

an additional push-button actuator;

wherein the additional-push-button actuator is disposed at a second side of the handle opposite the first side of the handle;

wherein the additional push-button actuator is coupled to an additional elastically deformable mechanical linkage such that, upon pressing the additional push-button actuator, the additional elastically deformable mechanical linkage deforms to move the additional movable blade distally along the longitudinal axis.

7. The device of claim 6, further comprising:

an elastically deformable biasing member;

wherein the elastically deformable biasing member is coupled to the elastically deformable mechanical linkage and the additional elastically deformable mechanical linkage such that, upon pressing the push-button actuator and the additional push-button actuator, the elastically deformable biasing member compresses, and upon releasing the push-button actuator and the additional push-button actuator, the elastically deformable biasing member decompresses to move the movable blade and the additional movable blade proximally along the longitudinal axis.

8. The device of claim 5, wherein:

the additional movable blade moves linearly along the longitudinal axis.

9. The device of claim 5, wherein:

the second blade is disposed between the movable blade and the additional movable blade.

10. The device of claim 1, wherein:

the plurality of blades are selectively operable as trimmer which cuts hair, or a deshedder which desheds hair without cutting.

11. The device of claim 1, wherein:

the movable blade is detachable from the device and attachable to the device by hooks disposed on the movable blade.

12. A method of operating a hair grooming device having a longitudinal axis, the method comprising:

providing the hair grooming device, the hair grooming device comprising a handle, the handle having a longitudinal length which extends along the longitudinal axis;

a plurality of blades, the plurality of blades each having a longitudinal length which extends along the longitudinal axis, and the plurality of blades each having a plurality of teeth and a plurality of hair receiving openings arranged along the longitudinal length of the blade in alternating succession, respectively;

wherein the plurality of blades comprise a movable blade which is movable along the longitudinal axis relative to a second blade of the plurality of blades;

wherein the plurality of teeth of the movable blade are movable relative to the plurality of hair receiving openings of the second blade such that each of the plurality of hair receiving openings of the second blade are at least partially laterally coverable at a first side of the second blade by one of the plurality of teeth of the movable blade, respectively, as the movable blade is moved along the longitudinal axis relative to the second blade; and moving the movable blade relative to the second blade such that each of the plurality of hair receiving openings of the second blade are at least partially laterally covered at a first side of the second blade by one of the plurality of teeth of the movable blade, respectively, by pressing a push-button actuator to move the movable blade distally along the longitudinal axis;

wherein the push-button actuator is disposed at a first side of the handle;

wherein the push-button actuator is coupled to an elastically deformable mechanical linkage such that, upon pressing the push-button actuator, the elastically deformable mechanical linkage deforms to move the movable blade distally along the longitudinal axis.

13. The method of claim 12, further comprising:

selectively operating the hair grooming device as trimmer which cuts hair, or a deshedder which desheds hair without cutting.

14. The method of claim 12, further comprising:

moving the movable blade proximally along the longitudinal axis.

15. The method of claim 14, wherein:

moving the movable blade proximally along the longitudinal axis is accomplished by an elastically deformable biasing member.

16. The method of claim 15, wherein:

the elastically deformable biasing member is coupled to the elastically deformable mechanical linkage such that, upon pressing the push-button actuator, the elastically deformable biasing member compresses, and upon releasing the push-button actuator, the elastically deformable biasing member decompresses to move the movable blade proximally along the longitudinal axis.

17. A hair grooming device having a longitudinal axis, the hair grooming device comprising:

a handle, the handle having a longitudinal length which extends along the longitudinal axis;

a plurality of blades, the plurality of blades each having a longitudinal length which extends along the longitudinal axis, and the plurality of blades each having a plurality of teeth and a plurality of hair receiving openings arranged along the longitudinal length of the blade in alternating succession, respectively;

wherein the plurality of blades comprise a movable blade which is movable along the longitudinal axis relative to a second blade of the plurality of blades;

wherein the plurality of teeth of the movable blade are movable relative to the plurality of hair receiving openings of the second blade such that each of the plurality of hair receiving openings of the second blade are at least partially laterally coverable at a first side of the second blade by one of the plurality of teeth of the movable blade, respectively, as the movable blade is moved along the longitudinal axis relative to the second blade;

wherein the plurality of blades further comprise an additional movable blade which is movable along the longitudinal axis relative to the second blade of the plurality of blades;

wherein the additional movable blade has a longitudinal length which extends along the longitudinal axis, and a plurality of teeth and a plurality of hair receiving openings arranged along the longitudinal length in alternating succession;

wherein the plurality of teeth of the additional movable blade are movable relative to the plurality of hair receiving openings of the second blade such that each of the plurality of hair receiving openings of the second blade are at least partially laterally coverable at a second side of the second blade opposite the first side of the second blade by one of the plurality of teeth of the additional movable blade, respectively, as the additional movable blade is moved along the longitudinal axis relative to the second blade.

18. The device of claim 17, wherein:

the movable blade moves linearly along the longitudinal axis.

19. The device of claim 17, wherein:

the second blade is not moveable along the longitudinal axis.

20. The device of claim 17, further comprising:

a push-button actuator and an additional push-button actuator;

wherein the push-button actuator is disposed at a first side of the handle;

wherein the additional-push-button actuator is disposed at a second side of the handle opposite the first side of the handle;

wherein the push-button actuator is coupled to an elastically deformable mechanical linkage such that, upon pressing the push-button actuator, the elastically deformable mechanical linkage deforms to move the movable blade distally along the longitudinal axis;

wherein the additional push-button actuator is coupled to an additional elastically deformable mechanical linkage such that, upon pressing the additional push-button actuator, the additional elastically deformable mechanical linkage deforms to move the additional movable blade distally along the longitudinal axis.

21. The device of claim 20, further comprising:

an elastically deformable biasing member;

wherein the elastically deformable biasing member is coupled to the elastically deformable mechanical linkage and the additional elastically deformable mechanical linkage such that, upon pressing the push-button actuator and the additional push-button actuator, the elastically deformable biasing member compresses, and upon releasing the push-button actuator and the additional push-button actuator, the elastically deformable biasing member decompresses to move the movable blade and the additional movable blade proximally along the longitudinal axis.

22. The device of claim 17, wherein:

the additional movable blade moves linearly along the longitudinal axis.

23. The device of claim 17, wherein:

the second blade is disposed between the movable blade and the additional movable blade.

* * * * *